US009450694B1

(12) United States Patent
Jung et al.

(10) Patent No.: US 9,450,694 B1
(45) Date of Patent: Sep. 20, 2016

(54) SELF-INTERFERENCE HANDLING IN A WIRELESS COMMUNICATION TERMINAL SUPPORTING CARRIER AGGREGATION

(71) Applicant: Google Technology Holdings LLC, Mountain View, CA (US)

(72) Inventors: Hyejung Jung, Palatine, IL (US); Colin D. Frank, Park Ridge, IL (US); Sandeep H. Krishnamurthy, Mountain View, CA (US); Vijay Nangia, Algonquin, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/676,300

(22) Filed: Apr. 1, 2015

Related U.S. Application Data

(62) Division of application No. 13/587,314, filed on Aug. 16, 2012, now Pat. No. 9,025,478.

(60) Provisional application No. 61/524,139, filed on Aug. 16, 2011.

(51) Int. Cl.
| | |
|---|---|
| *H04W 4/00* | (2009.01) |
| *H04J 3/14* | (2006.01) |
| *H04W 72/08* | (2009.01) |
| *H04W 52/36* | (2009.01) |
| *H04B 17/00* | (2015.01) |
| *H04W 72/12* | (2009.01) |
| *H04J 11/00* | (2006.01) |
| *H04W 72/04* | (2009.01) |
| *H04L 5/00* | (2006.01) |
| *H04W 52/24* | (2009.01) |
| *H04W 52/16* | (2009.01) |
| *H04W 52/14* | (2009.01) |

(52) U.S. Cl.
CPC ............ *H04J 11/005* (2013.01); *H04L 5/0007* (2013.01); *H04W 52/146* (2013.01); *H04W 52/16* (2013.01); *H04W 52/243* (2013.01); *H04W 52/365* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2006/0062174 A1* | 3/2006 | Tamir ................... | H04W 88/06 370/328 |
| 2008/0049851 A1 | 2/2008 | Nangia et al. | |
| 2008/0081655 A1* | 4/2008 | Shin ..................... | H04W 52/08 455/522 |
| 2009/0196240 A1* | 8/2009 | Frederiksen et al. | ......... 370/329 |
| 2009/0204863 A1* | 8/2009 | Kim et al. ................. | 714/748 |
| 2009/0285160 A1* | 11/2009 | Cheng et al. ................. | 370/328 |
| 2011/0026475 A1 | 2/2011 | Lee et al. | |

(Continued)

*Primary Examiner* — Chi H Pham
*Assistant Examiner* — Soon-Dong D Hyun
(74) *Attorney, Agent, or Firm* — Lerner, David, Littenberg, Krumholz & Mentlik, LLP

(57) ABSTRACT

A wireless communication terminal that has the self-interference due to the support of carrier aggregation, aggregating and jointly using two or more component carriers for transmission and reception, performs a first set of measurements on a received signal on a first operating frequency, wherein the first set of measurements are performed during which the wireless terminal transmits or receives signals on a second operating frequency. In an alternative embodiment, the wireless communication terminal changes the maximum transmit power limit on a first operating frequency on a per-slot basis to reduce the impact of harmonic or intermodulation distortion on a received signal at a second operating frequency.

5 Claims, 9 Drawing Sheets

(56) References Cited

U.S. PATENT DOCUMENTS

| | | |
|---|---|---|
| 2011/0158191 A1* | 6/2011 | Zhang et al. .............. 370/329 |
| 2012/0082022 A1 | 4/2012 | Damnjanovic et al. |
| 2012/0099545 A1* | 4/2012 | Han et al. ................. 370/329 |
| 2012/0140860 A1 | 6/2012 | Rimini et al. |
| 2012/0157101 A1 | 6/2012 | Uemura et al. |
| 2012/0213096 A1 | 8/2012 | Krishnamurthy et al. |
| 2012/0213162 A1 | 8/2012 | Koo et al. |
| 2012/0300701 A1* | 11/2012 | Uemura et al. ............ 370/328 |
| 2012/0314606 A1 | 12/2012 | Takano |
| 2013/0070609 A1 | 3/2013 | Hultell et al. |
| 2013/0148603 A1 | 6/2013 | Lee et al. |
| 2013/0182635 A1 | 7/2013 | Zhao et al. |
| 2014/0036664 A1 | 2/2014 | Han et al. |
| 2014/0099939 A1 | 4/2014 | Uemura et al. |
| 2014/0112277 A1 | 4/2014 | Yang et al. |

* cited by examiner

Inter-band carrier aggregation with harmonic relationship

Intra-band contiguous carrier aggregation with a single RF chain

400

SELF-INTERFERENCE HANDLING IN A WIRELESS COMMUNICATION TERMINAL SUPPORTING CARRIER AGGREGATION

CROSS REFERENCE TO RELATED APPLICATIONS

The present application is a divisional of U.S. patent application Ser. No. 13/587,314, filed Aug. 16, 2012, which claims the benefit of the filing date of U.S. Provisional Patent Application No. 61/524,139, filed Aug. 16, 2011, the disclosures of which are incorporated herein by reference.

FIELD OF THE DISCLOSURE

The present disclosure relates generally to wireless communications and, more particularly, to the avoidance or reduction of self-interference caused by harmonic distortion, inter-modulation (IM) distortion, or receiver images in carrier aggregation wireless communication terminals and corresponding methods.

BACKGROUND

In EUTRA LTE-Advanced, carrier aggregation (CA), where multiple component carriers are aggregated and jointly used for transmission and reception within a User Equipment (UE), is introduced to meet the peak data rate requirements of International Mobile Telecommunications (IMT)-Advanced, 1 Gbps and 500 Mbps for downlink and uplink, respectively. Furthermore, CA can provide reduced handover latency and overall, can provide consistent user experience and fairness.

Based on the frequency arrangement of aggregated component carriers (CC), carrier aggregation can be categorized as intra-band contiguous CA, intra-band non-contiguous CA, and inter-band non-contiguous CA. In intra-band contiguous CA, two or more adjacent CCs within a single operating band are aggregated while intra-band non-contiguous CA aggregates non-adjacent CCs in the same frequency band. Inter-band non-contiguous CA aggregates two or more CCs from different frequency bands.

While inter-band CA or intra-band non-contiguous CA allow wireless network operators to effectively utilize the fragmented spectrum, inter-band CA UE may suffer from significant amount of self-interference caused by harmonics of one uplink component carrier from a frequency band falling into another aggregated carrier's receive band or downlink component carrier in another frequency band supported by the inter-band UE. Self-interference may also occur due to intermodulation products of multiple uplink carriers falling into one of its LTE receive bands or receive bands of co-located other radios such as Bluetooth and/or WLAN and/or other cellular networks.

For example in FIG. 1, carrier aggregation scenario 100 of LTE Band 4 and Band 17 aggregation, B and C blocks of lower 700 MHz (uplink: 704-716 102 MHz, downlink: 734-746 MHz 104) and the A block of another spectrum (uplink: 1710-1720 MHz 106, downlink: 2110-2120 MHz 108) may be used together. For the CA capable UE operated in this scenario, the uplink transmission on band 704-707 MHz of Band 17 causes self-desensitization in the downlink band of Band 4 due to the 3rd order harmonic distortion 110, and the almost entire downlink channel band (2112-2120 MHz) in Band 4 can be affected by the harmonic interference. In addition, the harmonic distortion falling into the spectrum near the UE receive band of Band 4 can also cause desense due to potential intermodulation with the received signal.

3GPP RAN working group considers items on inter-band carrier aggregation such as Band 17+Band 4, Band 5+Band 12, Band 5+Band 17, and Band 7+Band 20, the scope of which includes simultaneous activation of two LTE uplink carriers in two bands. Various components at the transceiver path such as antennas, power amplifiers (PAs), connectors, and switches, can contribute to harmonics and intermodulation interference. When two carriers are aggregated with a small frequency separation, the reverse inter-modulation, which is the leakage from one PA output mixed with the input signal of another PA when there is simultaneous transmission on both the carriers, occurs due to co-located PAs for different bands. For example, in uplink CA of Band 5 and Band 12, the 3rd order intermodulation distortion (IMD) falling into the lower Industrial-Scientific-Medical (ISM) band (2400-2414 MHz) can desensitize WLAN and Bluetooth receivers operated in those channels. In 3GPP LTE Rel-11 or future releases, aggregation of more than two component carriers is likely to be supported, and intra-band non-contiguous carrier aggregation may be allowed, which result in more scenarios of self-interference due to inter-modulation or harmonics.

Another example of the self-interference is the receiver image interference from adjacent CCs in intra-band contiguous CA 200 is shown in FIG. 2. For the UE supporting multiple contiguous CCs, such as DL CC 1 202 and DL CC 2 204, via a single radio frequency (RF) chain, the receiver image from the adjacent CC may significantly degrade the signal-to-interference and noise ratio (SINR) of the victim CC if the received signal power on the adjacent CC is much higher than the received signal power on the victim carrier. Thus, the received signal power difference between two adjacent CCs which UE can handle is likely to be dependent on UE image rejection capability.

It is expected that self-interference would impact a cell-edge user throughput as the cell-edge UE transmits close to the maximum transmit power while receiving weak downlink signals. However, the mean user throughput is likely not impacted as much. For example, the 5%-tile downlink received signal level is around −70 dBm, which is translated to −98 dBm/15 kHz for a 10 MHz downlink. If the output power of PA is 23 dBm with uplink allocation over 180 KHz, the corresponding 3rd order harmonic response is 7.4 dBm/15 KHz—harmonic suppression capability (in dBc). If the harmonic suppression capability is less than 100 dBc, there will be degradation to the cell-edge user throughput.

Various methods have been developed to reduce the self-interference caused by intermodulation of uplink signals simultaneously transmitted from two different radio access technologies (RAT). These methods disclosed reporting channel quality information (CQI) of the second RAT while the first RAT is active, and at least one subband CQI reported includes potential desense region. However, "fake CQI" (an indication of unusable subband or resource blocks) is reported for the potential desense region without estimating the desense or interference level. Only when UE receives an indicator to report additional CQI reflecting the impact of IMD, the actual CQI can be reported and used by the scheduler.

Considering that each wireless communication terminal operated in a wireless network may have different RF characteristics and performances, applying band/channel combination specific scheduling restrictions at base station schedulers in a consistent manner in order to avoid the self-interference may limit the flexible and effective use of radio resources. Scheduling restrictions also cause extra burden to network equipment vendors due to the increased complexity. Furthermore, in LTE-Advanced carrier aggregation, the potential desense region due to harmonics or IMD may be the entire receive band of one carrier since two wideband LTE channels are aggregated. Therefore, scheduling decision or component carrier management based on the actual self-interference level in each terminal may be beneficial for efficient use of radio resources.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

Figure 1:
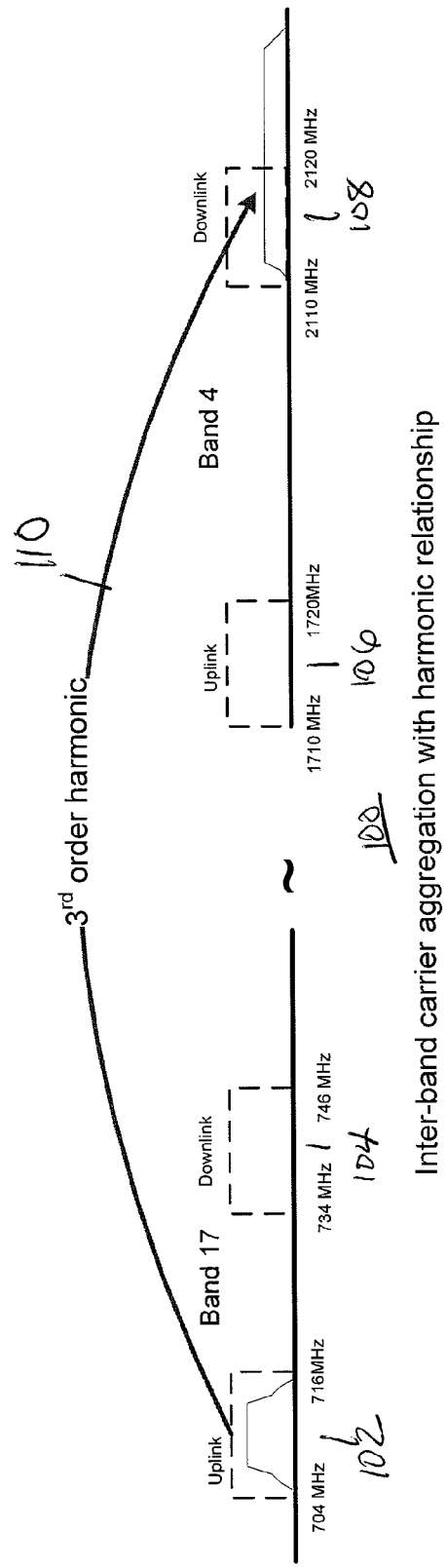
FIG. 1 illustrates the self-interference in a wireless communication terminal supporting inter-band carrier aggregation.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Emerging broadband wireless networks such as 3GPP LTE and LTE-Advanced must solve the problems of minimizing the PA power consumption (or peak and/or mean current drain), cost, and the complexity required to deliver a specified conducted power level and of enhancing linearity of transmitter and receiver components (e.g. PA, low noise amplifier, mixer, analog-to-digital converter, and digital-to-analog converter) in the context of new modes of system operation. For example, PA and RF front-end filter performances must be optimized in the presence of numerous different frequency or spatially adjacent radio access technologies, including GSM, UMTS, WCDMA, unlicensed transmitter and receivers, among other radio access technologies.

Several embodiments are disclosed to address problems of self-interference caused by harmonic/intermodulation distortion and/or receiver images in a wireless communication terminal with carrier aggregation jointly using multiple component carriers for transmission and reception within the terminal. It should be understood by one skilled in the art, that although some of the embodiments are described in the regime of LTE-Advanced carrier aggregation, the embodiments described are applicable to devices supporting other radio access technologies (RAT) capable of aggregating multiple component carriers such as dual band dual carrier high speed uplink packet access (DB-DC-HSUPA) and also to multi-mode devices allowing concurrent transmission and reception of multiple radio access technologies. In addition, some of the embodiments are applicable to devices having any self-interference, which is occurred by its own transceiver during transmission or reception of signal.

An embodiment encompasses a method in a wireless communication terminal for handling self-interference and communicating with a network entity over at least a first downlink channel and at least an aggressor channel. The method includes performing self-interference measurements on a received signal on the first downlink channel, wherein a first measurement is over a first set of resource blocks of the received signal which are affected by self-interference due to communication on the aggressor channel, and a second measurement is over a second set of resource blocks of the received signal which include self-interference free resource blocks, and wherein at least the first measurement is performed during time periods that overlap time periods during which the wireless communication terminal is communicating on the aggressor channel, and transmitting a measurement report based on the first and the second measurement to the network entity.

The method in this embodiment may further include receiving from the network entity an indication to perform self-interference measurements on the received signal in the first downlink channel. The aggressor channel may be an uplink channel or uplink component carrier or a downlink channel or downlink component carrier of a serving cell. The self-interference on victim downlink channel may be due to harmonic distortion from transmission in an uplink aggressor channel or carrier, inter-modulation distortion from transmission on at least two aggressor channels, receiver image due to relative high power reception on a downlink aggressor channel.

Another embodiment encompasses a method in a network entity for management of network resources and handling self-interference in wireless communication terminals that the network entity supports. The network entity communicates with a wireless communication terminal over at least a first downlink channel and at least an aggressor channel. The method includes transmitting, by the wireless communication network entity, a signal on the first downlink channel, receiving, by the wireless communication network entity, a measurement report based on a first and a second measurement from the wireless communication terminal, wherein the first measurement is over a first set of resource blocks corresponding to reception of the signal on the first downlink channel which are affected by self-interference due to communication on the aggressor channel, and, the second measurement is over a second set of resource blocks on the first downlink channel which include self-interference free resource blocks, and wherein at least the first measurement is performed during time periods that overlap time periods during which the wireless communication terminal is communicating on the aggressor channel, and performing management of resources on the first downlink channel and the aggressor channel based on the measurement report. The management of resources on the first downlink channel and the aggressor channel may comprise activation and deactivation of each channel, configuring one channel as a primary cell, and reselecting another channel as a primary cell.

Yet another embodiment encompasses a method in a wireless communication terminal for handling self-interference and communicating over at least a first downlink channel and at least an uplink channel. The method includes determining based on a downlink signal whether an uplink signal is scheduled for transmission on the uplink channel in a subframe, wherein the uplink signal spans at least two timeslots in the subframe and the uplink signal comprises a first set of resource blocks in a first timeslot and a second set of resource blocks, different from the first set of resource blocks, in a second time slot; determining a first value for power reduction for transmission of the uplink signal in the first timeslot; determining a second value for power reduction for transmission of the uplink signal in the second timeslot; and transmitting the uplink signal in the subframe comprising at least the first timeslot and the second timeslot based on the first value for power reduction and the second value for power reduction.

Yet another embodiment encompasses a method in a wireless communication terminal for handling self-interference. The method includes, receiving, by the wireless terminal, a scheduling grant allocating uplink resources, transmitting, by the wireless terminal, suppression capability information in a radio resource control (RRC) message on the allocated uplink resources, wherein the suppression capability information is one or more of a harmonic, inter-modulation, or receiver image level suppression relative to aggressor signal transmission power.

Another embodiment encompasses a method in a network entity for handling self-interference in wireless communication terminals that the network entity supports and communicating over at least a first downlink channel and one or more aggressor channels. The method includes allocating radio resources of the one or more aggressor channels to a wireless communication terminal potentially having self-interference in a manner to protect reception of critical downlink signals transmitted on the first downlink channel, wherein the critical downlink signals are a part of a synchronization channel (SCH), physical broadcast channel (PBCH) carrying MasterInformationBlock (MIB), and physical downlink shared channel (PDSCH) carrying SystemInformationBlocks (SIBs) or paging message.

Another embodiment of the present invention encompasses a method in a wireless communication terminal for handling self-interference. The method includes not transmitting PUCCH or PUSCH on a subset of symbols on one or more uplink channels, applying a Maximum Power Reduction (MPR) to some symbols of the subframe on one or more uplink channels, wherein a set of symbols not transmitted or transmitted with MPR is determined based on the current value of timing advance.

Figure 2:
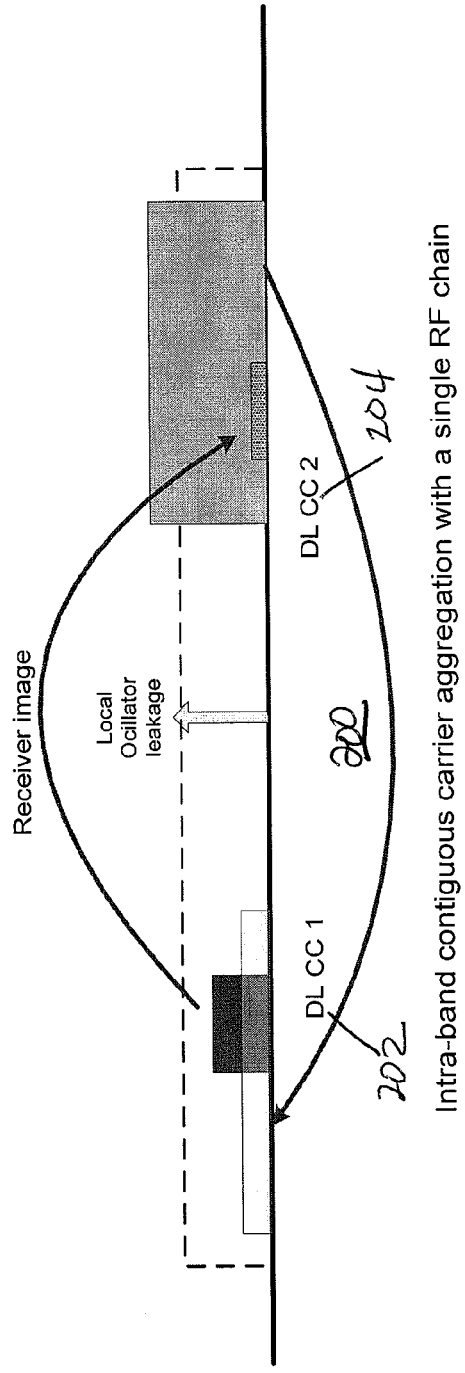
FIG. 2 illustrates the self-interference in a wireless communication terminal supporting intra-band contiguous carrier aggregation.
Figure 3:
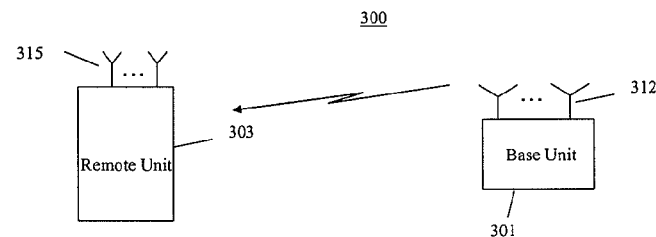
FIG. 3 illustrates a wireless communication system.
Figure 3:
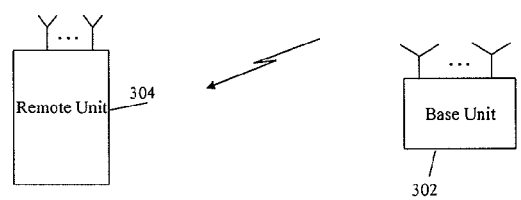

Turning to FIG. 3, a multi-carrier wireless communication system 300 comprises one or more fixed base infrastructure units 301, 302 forming a network distributed over a geographical region for serving remote units in the time and/or frequency and/or spatial and/or code domain. A base unit may also be referred to as an access point, access terminal, base, base station, Node-B, eNode-B, a relay node, femto cell, Home Node-B, Home eNode-B, network entity or by other terminology used in the art. The one or more base units 301, 302, as explained with respect to FIG. 2, each comprise one or more transmitters for downlink transmissions and one or more receivers for receiving uplink transmissions that serve the remote units.

The number of transmitters at the base unit may be related, for example, to the number of transmit antennas 312 at the base unit. When multiple antennas are used to serve each sector to provide various advanced communication modes, for example, adaptive beam-forming, transmit diversity, and multiple stream transmission, etc., multiple base units can be deployed. These base units 301, 302 within a sector may be highly integrated and may share various hardware and software components. For example, a base unit may also comprise multiple co-located base units that serve a cell (not shown). The base units are generally part of a radio access network 300 that includes one or more controllers communicably coupled to one or more corresponding base units.

The access network is generally communicably coupled to one or more core networks, which may be coupled to other networks, like the Internet and public switched telephone networks, among other networks. These and other elements of access and core networks are not illustrated but they are well known generally by those having ordinary skill in the art. The network base units communicate with remote units to perform functions such as scheduling the transmission and receipt of information using radio resources. The wireless communication network may also comprise management functionality including information routing, admission control, billing, authentication etc., which may be controlled by other network entities. These and other aspects of wireless networks are known generally by those having ordinary skill in the art.

Figure 4:
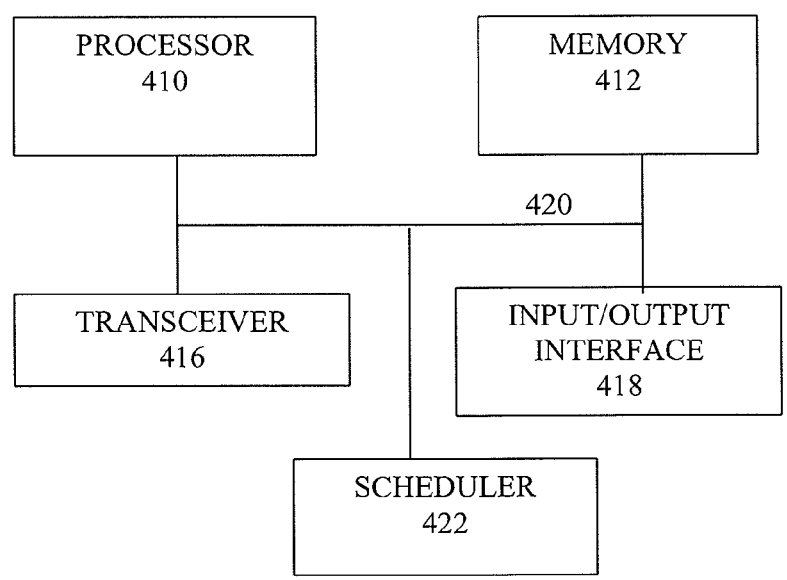
FIG. 4 illustrates a schematic block diagram of a wireless communication terminal.

In FIG. 3, the one or more base units serve a number of remote units 303, 304 within a corresponding serving area, for example, a cell or a cell sector via a wireless communication link. The remote units 303, 304 may be fixed units or mobile terminals. The remote units may also be referred to as wireless communication terminal, subscriber units, mobiles, mobile stations, users, terminals, subscriber stations, user equipment (UE), user terminals, relays, or by other terminology used in the art. The remote units also comprise one or more transmitters and one or more receivers, as shown in FIG. 4. The number of transmitters may be related, for example, to the number of transmit antennas 315 at the remote unit.

In FIG. 3, the base unit 301 transmits downlink communication signals on a downlink channel or a downlink carrier to serve remote unit 303 in the time and/or frequency and/or spatial and/or code domain. The remote unit 303 communicates directly with base unit 301 via uplink communication signals on an uplink channel or uplink carrier. The downlink and uplink carrier may be the same in case of TDD (Time Division Duplex). A remote unit 304 communicates directly with base unit 302. In some cases the remote unit may communicate with the base unit indirectly through an intermediate relay node (not shown).

In one implementation, the wireless communication system is compliant with the 3GPP Universal Mobile Telecommunications System (UMTS) LTE protocol, also referred to as EUTRA or Release-8 (Rel-8) 3GPP LTE or some later generation thereof, wherein the base unit transmits using an orthogonal frequency division multiplexing (OFDM) modulation scheme on the downlink and the user terminals transmit on the uplink using a single carrier frequency division multiple access (SC-FDMA) scheme, or a discrete Fourier Transform spread OFDM (DFT-SOFDM). In yet another implementation, the wireless communication system is compliant with the 3GPP Universal Mobile Telecommunications System (UMTS) LTE-Advanced protocol, also referred to as LTE-A or some later generation or release of LTE wherein the base unit transmits using an orthogonal frequency division multiplexing (OFDM) modulation scheme on a single or a plurality of downlink component carriers and the user terminals can transmit on the uplink using a single or plurality of uplink component carriers. More generally, however, the wireless communication system may implement some other open or proprietary communication protocol, for example, WiMAX, among other protocols. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division and/or spatial division multiplexing/multiple access techniques, or a combination of these various techniques. In alternative embodiments, the wireless communication system may utilize other communication system protocols including, but not limited to, TDMA or direct sequence CDMA. The communication system may be a TDD (Time Division Duplex) or FDD (Frequency Division Duplex) system. The disclosure is not intended to be limited to the implementation of any particular wireless communication system architecture or protocol.

In OFDM networks, both Time Division Multiplexing (TDM) and Frequency Division Multiplexing (FDM) are employed to map channel-coded, interleaved and data-modulated information onto OFDM time/frequency symbols. The OFDM symbols can be organized into a number of resource blocks consisting of M consecutive sub-carriers for a number N consecutive OFDM symbols where each symbol may also include a guard interval or cyclic prefix (CP). An OFDM air interface is typically designed to support carriers of different bandwidths, e.g., 5 MHz, 10 MHz, etc. The resource block size in the frequency dimension and the number of available resource blocks are generally dependent on the bandwidth of the system.

In FIG. 4, a schematic block diagram of a wireless communication terminal 400 is shown. Communication device 400 can be network equipment such as a base unit 301, 302 or a wireless communicating device such as remote unit 303, 304. Communication device 400 comprises a controller/processor 410 communicably coupled to memory 412, a transceiver 416, input/output (I/O) device interface 418 via a system bus 420. The UE is compliant with the protocol of the wireless communication system within which it operates, for example, the 3GPP LTE Rel-8 or later generation protocol discussed above.

In FIG. 4, the controller/processor 410 may be implemented as any programmed processor. However, the functionality described herein may also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a programmable logic array, field programmable gate-array, or the like.

In FIG. 4, the memory 412 may include volatile and nonvolatile data storage, including one or more electrical, magnetic or optical memories such as a random access memory (RAM), cache, hard drive, read-only memory (ROM), firmware, or other memory device. The memory may have a cache to speed access to specific data. Data may be stored in the memory or in a separate database. The memory may be embedded with an ASIC that may include the baseband processor. Such memory is sometimes referred to as on-chip memory. Alternatively, the memory may be shared with other processors in the device such as an application or graphics processor, in which case the memory may be referred to as off-chip memory.

The transceiver 416 is capable of communicating with user terminals and base stations pursuant to the wireless communication protocol implemented. The wireless transceiver 416 is representative of a first transceiver that communicates pursuant to a first wireless communication protocol and possibly a second transceiver that communicates pursuant to a second wireless communication protocol like the WiFi or Bluetooth protocols. In one embodiment, the first protocol is a cellular communication protocol like 3GPP LTE or some other known or future wireless protocols examples of which were described above. The transceiver 416 is communicably coupled to a processor 410, and includes functionality that controls the transmission and reception of information by the one or more transceivers. The transceiver also includes functionality that decodes information received by the one or more transceivers. The I/O device interface 418 connects to one or more input devices that may include a keyboard, mouse, pen-operated touch screen or monitor, voice-recognition device, or any other device that accepts input. The I/O device interface may also connect to one or more output devices, such as a monitor, printer, disk drive, speakers, or any other device provided to output data.

In the embodiment where the device 400 is a network entity such as a base station or eNode B, the device 400 includes a scheduler 422. As explained in more detail below, the scheduler 422 determines a frequency and time resource allocation that maps information for a particular UE. The scheduler used information received by the network entity from the UE. In an embodiment, the scheduler can allocate all or a portion of a resource block. In addition, the scheduler allocates resource blocks for both an aggressor carrier and a victim carrier.

Referring back to FIGS. 1 and 2, a wireless communication terminal in the multi-carrier network generally supports multiple carriers comprising at least two component carriers, wherein each component carrier is associated with a configured bandwidth. For example, a first component carrier may be associated with a first bandwidth and a second component carrier may be associated with a second bandwidth, and so on. The component carrier may be a downlink component carrier or an uplink component carrier in the case of FDD or support both downlink and uplink in the case of TDD. The downlink component carrier and uplink component carrier may have the same or different bandwidth. In one embodiment, the first configured bandwidth of the first component carrier is not equal to the second configured bandwidth of the second component carrier. For instance, the first component carrier bandwidth may be 15 MHz, while the second component carrier may be 5 MHz, leading to an aggregate bandwidth of 20 MHz. In another embodiment, the first configured bandwidth of the first component carrier is equal to the second configured bandwidth of the second component carrier. For instance, the first and second component carriers have an equal bandwidth of 10 MHz each, leading to an aggregate bandwidth of 20 MHz.

The wireless communication terminal can transmit and receive data transmissions on multiple component carriers using multiple serving cells with each serving cell associated with a particular component carrier of a particular bandwidth. Each serving cell is associated with a downlink component carrier and may be associated with an uplink component carrier. The wireless communication terminal can indicate to the network the number of component carriers it supports using Radio Resource Configuration (RRC) signaling. Alternately, the wireless communication terminal can also indicate to the network via RRC signaling, the number of component carriers it can support and the number of spatial layers (i.e., the number of TBs that the device can receive via spatial multiplexing) it can support for each component carrier or the total number of spatial layers over all the component carriers it supports or a subset of the supported component carriers.

The cellular wireless terminal performs measurements on a serving cell related to received signal strength/quality such as reference signal received power (RSRP), reference signal received quality (RSRQ), and received signal strength indicator (RSSI), and evaluates channel quality indications (CQI) for downlink subframes. If the self-interference significantly degrades an operating SINR and RSRQ of a potential victim cell and/or the received signal power from the victim cell is lower than a threshold (low RSRP is likely for cell-edge UEs), then the schedulable downlink resource blocks (RB) on the victim cell will be very limited and it may be better not to activate both the victim cell and aggressor cell simultaneously. That is, to configure, activate, and deactivate cells associated with a potential victim or aggressor carrier frequency with potential self-interference issues, a measurement metric should take into account the self-interference level and a measurement report should be able to envision the impact of the self-interference on the victim cell performance. This leads to a need for new special radio resource management (RRM) or radio link monitoring (RLM) measurements.

According to one embodiment, a wireless terminal is configured to report the self-interference level through self-interference measurement reports. More particularly, UE measures or estimates RSRQ and/or CQI degradation due to the self-interference on a downlink channel or carrier and preferably reports an offset (RSRQ and/or CQI degradation relative to RSRQ and/or CQI obtained from self-interference free resource blocks) along with RSRQ and/or CQI obtained from self-interference free resource blocks. UE transmits or receives aggressor signals on potential one or more aggressor channels or carriers during a measurement period configured as a self-interference measurement. In one embodiment, if one or more aggressor carriers are non-configured or deactivated, the base station or network entity configures an aggressor signal transmission (uplink signal for harmonic/IM interferences and downlink signal for receiver image interference) during the measurement period to determine the self-interference impact on the victim cells. In an alternate embodiment, the UE performs self-interference measurement only on occasions when an aggressor signal transmission occurs.

Figure 5:
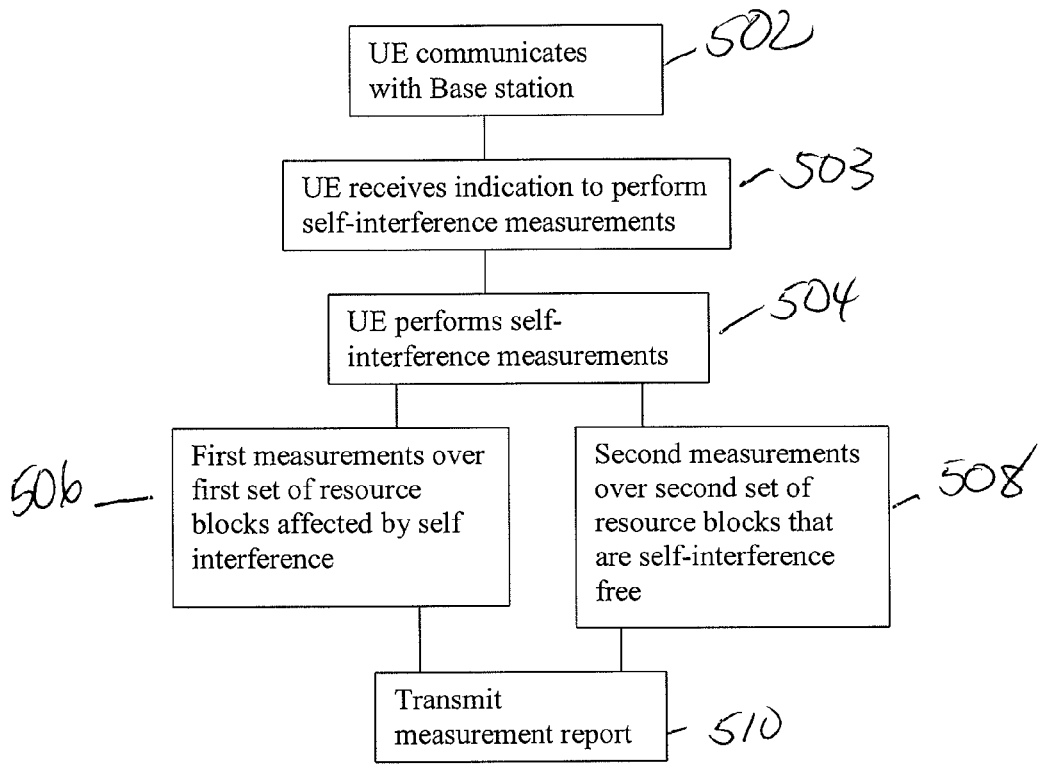
FIG. 5 illustrates a flowchart showing a process for measuring and reporting the self-interference in a wireless communication terminal according to an embodiment.

Turning to FIG. 5, a wireless communication terminal or UE communicates 502 with a base station or network entity over at least a first downlink channel and at least an aggressor channel. The UE can receive from the network entity an indication to perform 503 self-interference measurements on the received signal in the first downlink channel. In one implementation, the aggressor channel is an uplink channel, and the UE transmits uplink signal on the aggressor channel during at least a measurement period for performing the first measurement. In another implementation, the UE communicates with the network entity over at least two serving cells, each serving cell supporting at least a downlink component carrier, wherein the first downlink channel is a first downlink component carrier of a first serving cell, and the aggressor channel is an uplink component carrier of a second serving cell. In yet another implementation, the aggressor channel is a second downlink channel, and the UE receives a downlink signal on the aggressor channel during at least a measurement period for performing the first measurement. In another implementation, the UE communicates with the network entity over at least two serving cells, each serving cell supporting at least a downlink component carrier, wherein the first downlink channel is a first downlink component carrier of a first serving cell, and the aggressor channel is a second downlink component carrier of a second serving cell.

In response to receiving the indication, the UE performs 504 self-interference measurements on a received signal on the first downlink channel. The self-interference measurements can include 506 a first measurement over a first set of resource blocks of the received signal which are affected by self-interference due to communication on the aggressor channel, and can include 508 a second measurement over a second set of resource blocks of the received signal which include self-interference free resource blocks. In an embodiment, the first measurement is performed during time periods that overlap time periods during which the wireless communication terminal is communicating on the aggressor channel. The wireless communication terminal can transmit 510 a measurement report based on the first and the second measurement to the network entity.

In one embodiment, the measurement report comprises the first measurement and the second measurement. In another embodiment, the measurement report comprises the difference of the first measurement and the second measurement.

Figure 6:
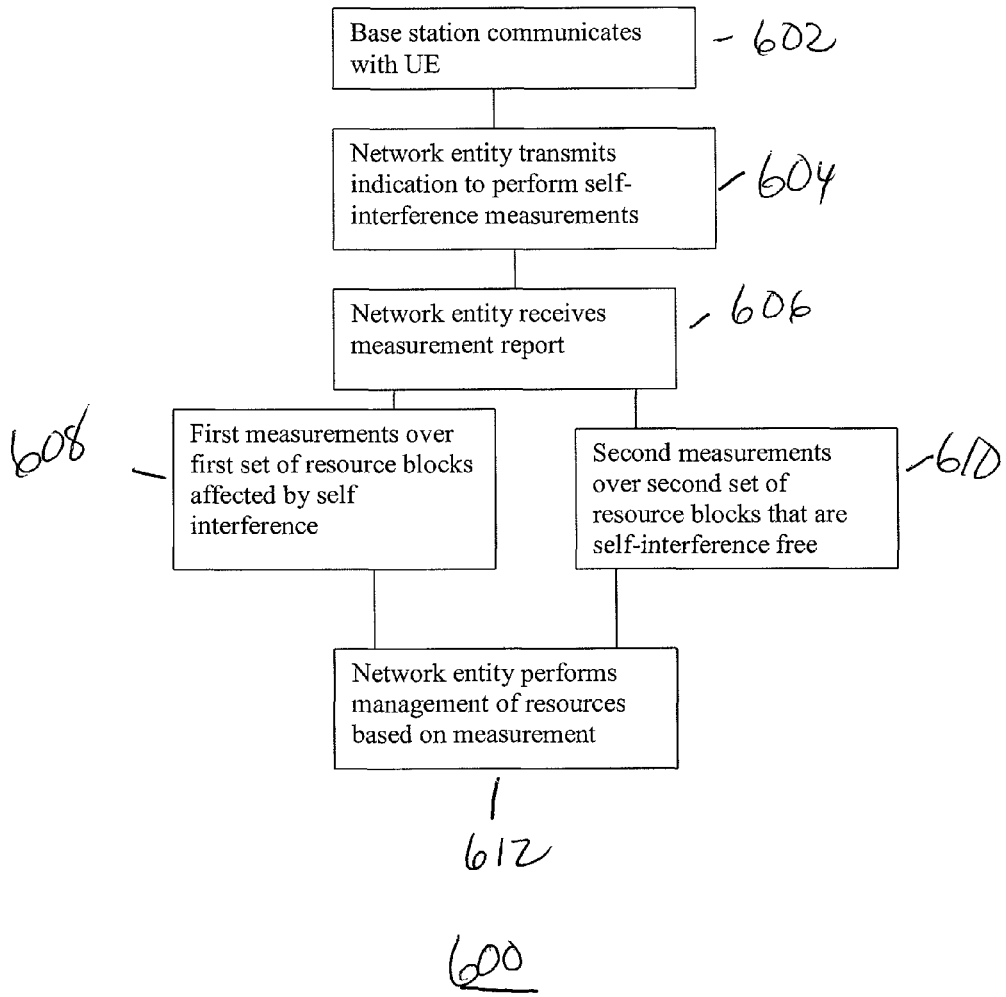
FIG. 6 illustrates a flowchart showing a process for receiving a measurement report of the self-interference and managing the network resource in a network entity according to another embodiment.

FIG. 6 illustrates a network entity, such as a base station, that communicates 602 with a UE or wireless communication terminal over a downlink channel and at least one aggressor channel. The network entity transmits 604 to the wireless communication terminal an indication to perform self-interference measurements on the first downlink channel. In response, the network entity receives 606 a measurement report based on a first and second measurement. In one embodiment, the measurement report comprises the first measurement and the second measurement. In another embodiment, the measurement report comprises the difference of the first measurement and the second measurement.

The first measurement 608 is over a first set of resource blocks corresponding to the reception of the signal on the first downlink channel that is affected by self-interference due to communication on the aggressor channel. The self-interference can be due to harmonic or intermodulation distortion interference. The first measurement can be performed during time periods during which the wireless communication terminal is communicating on the aggressor channel. The second measurement 610 is over a second set of resource blocks on the first downlink channel which includes self-interference free blocks.

The network entity performs 612 management of resources on the first downlink channel and the aggressor channel based on the received measurement report. The management of resources can include activation and deactivation of each channel, configuring one channel as a primary cell and reselecting another channel as a primary cell.

The first set of resource blocks and the second set of resource blocks can be determined based on a frequency relationship between a frequency location of aggressor signal on the aggressor channel and a frequency location of corresponding self-interference on the first downlink channel. The frequency relationship is based on a physical resource block number relationship between the aggressor signal on the aggressor channel and the signal on the first downlink channel.

In an embodiment of FIG. 6, the aggressor channel can be an uplink channel. In this embodiment, the network entity schedules transmission to the wireless communication terminal of an uplink signal for performing the first measurement on the aggressor channel during a measurement period. The self-interference due to transmission on the aggressor channel is due to one of a harmonic and an intermodulation distortion interference. The network entity can communicate with the wireless communication terminal over at least two serving cells where each serving cell supports downlink component carriers. The first downlink channel can be a first downlink component carrier of a first serving cell and the aggressor channel is an uplink component carrier of the second serving cell.

In another embodiment of FIG. 6, the aggressor channel can be a second downlink channel. The network entity in this embodiment transmits a downlink signal on the aggressor channel during at least a measurement period for the wireless communication terminal to perform the first measurement. The self interference can be due to receiver image of the downlink signal within the first downlink channel.

One embodiment is that UE obtains uplink (UL) and downlink (DL) carrier frequencies from system information communicated to the UE for the supported carrier aggregation (CA) band combinations, and derives the physical resource block (PRB) number relationship between one or more aggressor channel bands and a victim channel band. For example, the PRB number relationship between the Band 17 uplink channel, 705-715 MHz (aggressor), and the Band 4 downlink channel, 2110-2120 MHz (victim), is computed as follows for third-order harmonic interference with contiguous RB allocation in UL:

$$n_{PRB}^{B4} = \left\lfloor \frac{3 \cdot (705.5 + n_{PRB}^{B17} \cdot 0.18) - 2110.5}{0.18} \right\rfloor,$$

where $n_{PRB}^{B4}$ and $n_{PRB}^{B17}$ are PRB numbers of Band 4 downlink and Band 17 uplink, respectively. The aggressor-victim PRB number relationship can be used to find out PRB numbers of the corresponding potential desense region for PRBs on the aggressor carrier.

Thus, in one embodiment, the UE determines the first set of resource blocks which are affected by self-interference and the second set of resource blocks which include self-interference free resource blocks on the first downlink channel based on a frequency relationship between a frequency location of aggressor signal on the aggressor channel and a frequency location of corresponding self-interference on the first downlink channel. The frequency relationship can be physical resource block (PRB) number relationship between the aggressor signal on the aggressor channel and the received signal on the first downlink channel.

Suppose that a UE supports a carrier aggregation band combination with one or more potential victim and aggressor carrier frequencies due to harmonics or intermodulation products. If the UE signals supported band combinations to a base station and camps on one of victim or aggressor frequencies, then the base station configures the UE for a harmonic or intermodulation self-interference measurement on the potential victim frequency through higher-layer, for example, radio resource control (RRC) signaling. A self-interference measurement is not configured if any combination of carrier frequencies supported in the network for inter-band aggregation does not cause the self-interference in the UE.

If a UE is configured for harmonic interference measurements by RRC signaling and a carrier frequency of the primary cell (PCell) is either a victim or an aggressor frequency in supported CA band combinations, the UE transmits uplink signal in the aggressor carrier frequency while performing measurements on the potential victim carrier frequency. The measurements may be performed via either inter-frequency or intra-frequency measurements. A primary cell is referred to the serving cell that provides NAS mobility information and security information to the UE.

If a UE is configured for intermodulation interference measurements by RRC signaling and a carrier frequency of the PCell is either a victim or an aggressor frequency in supported CA band combinations, the potential victim carrier frequency is measured via one of inter-frequency or intra-frequency measurements with uplink transmission in all aggressor carrier frequencies that result in intermodulation interference on the victim frequency.

Currently, 3GPP EUTRA LTE TS 36.133 allows a measurement gap for measuring non-configured (not configured as a secondary cell, SCell) frequencies in inter-band carrier aggregation. However, with the proposed harmonic or intermodulation self-interference measurement configured, a UE may turn on the receive RF chain of the victim band for the measurement of the non-configured victim frequency, and maintain uplink and downlink activities in the PCell without interruption during the measurement. In order to minimize the additional UE power consumption from the self-interference measurement, the UE can alternate between the conventional inter-frequency measurement (possibly with a measurement gap, that is, no uplink transmission on aggressor carriers) and the self-interference harmonic or intermodulation measurement for the non-configured victim frequency.

For example, for a UE capable of Band 4 and Band 17 aggregation, when a serving cell with Band 17 carrier is configured as the PCell and a potential victim carrier frequency in Band 4, which is not associated with any configured SCell (Secondary Cell which can be configured to form together with the PCell a set of serving cells which the UE can use for communication with the network entity), is measured through inter-frequency measurement, the UE is configured to send uplink signal on the Band 17 aggressor carrier frequency during measurement, in order to include the 3rd order harmonic interference to the measurement results. Since UE is expected to be equipped with separate RF chains for each band in inter-band carrier aggregation of high and low frequencies combination, the inter-frequency measurement of the Band 4 carrier is likely to be feasible without measurement gap and accordingly, transmission on the Band 17 uplink carrier during inter-frequency measurement is feasible.

If the aggressor carrier is deactivated or not configured, the base station signals to the UE appropriate uplink transmission configurations with transmit power and RB allocations for the self-interference measurement. This uplink signal transmitted on the deactivated or non-configured aggressor carrier during the measurement may be sounding reference signal (SRS)-like signal, and the base station can use it for path loss or channel quality estimation or other purposes.

For example, if the Band 4 carrier (victim) is configured as a PCell and the harmonic measurement is configured for the UE, then the Band 4 carrier measurement is done with Band 17 uplink transmission irrespective of whether the Band 17 aggressor carrier is configured as an SCell or not. Alternatively, the UE only performs measurement in victim Band 4 carrier frequency when an UL transmission occurs in the Band 17 aggressor carrier frequency.

If a UE is configured for harmonic or intermodulation interference measurements, the UE generates two sets of measurement values (e.g. RSRP, RSRQ, RSSI), one obtained from a set of resource blocks (RBs), a significant portion of which are affected by the harmonic or intermodulation interference, and the other from a set of RBs without the harmonic or intermodulation interference. Note that the harmonic/IM interference power level observed in the victim cell's receive band depends on the UE harmonic/IM suppression capability, UE transmit power level, and uplink allocation in one or more aggressor carriers. By averaging measurement values (obtained in each slot or subframe) over several slots or subframes within a measurement period, the average degradation of RSRQ due to the harmonic/IM interference can be obtained. In the measurement report, UE sends RSRP and RSRQ obtained from harmonic/IM interference-free resource blocks and the average RSRQ offset.

In another embodiment, during CA operation with Band 17 PCell and Band 4 SCell, RSRQ measurement on Band 4 SCell may be configured to occur only during occasions when the UE is not transmitting on Band 17 PCell. As the UE has complete knowledge when UL transmission is scheduled, no subframe subset configuration signaling is needed to be sent to the UE. Additionally, the UE may be configured to perform RSRQ measurements on SCell during occasions when the UE UL is active on PCell. These measurements include the impact of the harmonics and/or intermodulation distortion which is a function of the UE transmit power and allocation. Such measurements may be normalized to a reference power and reference allocation size prior to reporting or averaging the measurements. The measurements may be further conditioned to occur only when the interference impacts a particular set of downlink resource blocks.

The new set of measurements (RSRP, RSRQ, and CQI obtained from the harmonic/IM interference-free RBs and CQI/RSRQ offsets) obtained by the self-interference harmonic or intermodulation measurement is used by the network in order to determine whether to configure, activate, or deactivate SCell and perform SCell-to-PCell switching and handover in the inter-band combination scenario with the potential self-interference from harmonic or intermodulation distortion. Similarly, the base station can use the new measurement reports on the UE receiver image interference for DL power control and scheduling in each component carrier, and for SCell deactivation.

The power radiated into an adjacent frequency band and the harmonic and intermodulation distortion by a UE are governed by several design criteria related to the implementation of mobile terminal transmitters, including oscillator phase noise, digital-analog converter (DAC) noise, power amplifier linearity (in turn controlled by power amplifier mode, cost, power consumption etc.), RF front-end filter responses, among others.

Thus, in one embodiment a harmonic/IM distortion level or the receiver image level relative to aggressor uplink (for harmonic/IM) or downlink (for receiver image) transmission power can be measured for typical and the worst-case performances. A UE can report such measures to the serving base station as part of capability exchanges. The base station can subsequently use this information jointly with power control updates and reported DL channel measurements in order to determine resource allocation on the aggressor carriers.

Figure 7:
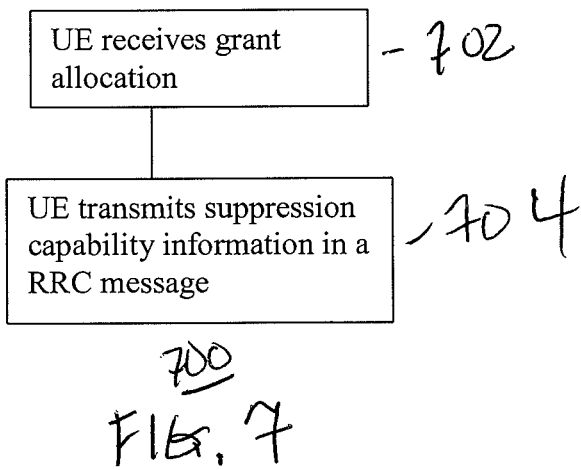
FIG. 7 illustrates a flowchart showing a process for handling the self-interference in a wireless communication terminal according to yet another embodiment.

As seen in FIG. 7, the UE receives 702 a scheduling grant allocating uplink resource. In response, the UE transmits 704 its suppression capability information in a radio resource control (RRC) message, wherein the suppression capability information is one or more of a harmonic, intermodulation, or receiver image level suppression relative to aggressor signal transmission power. The suppression capability information can be one or both of typical and worst-case suppression capability information. Additionally, the suppression capability information can be based on one or more of wireless terminal measurements, and wireless terminal manufacturer's measurements and declarations. The suppression capability information based on wireless terminal measurements can be semi-static information due to filter, power amplifier, or other components' performance variation over temperatures. The UE may transmit the suppression capability information periodically to the serving base station or network entity.

Another embodiment is that UE estimates its harmonic/IM suppression capability, which may vary in a semi-static way due to filter/PA or other components' performance variation over temperatures, and sends it to the base station (e.g., periodically). UE computes RSSI from a set of RBs (Set 1) affected by the harmonic/IM interference, and another RSSI from a set of RBs (Set 2) which is harmonic/IM interference-free, adjacent to Set 1 in frequency and/or time, and has the same number of RBs as Set 1. UE can assume that the difference between two computed RSSI values is an estimate of the harmonic/IM interference level, $I_h$. Alternatively, the number of RBs in Set 1 and Set 2 may be different and the RSSI is normalized by the number of RBs in the set before taking the difference to estimate the harmonic/IM interference level.

Additionally, since UE knows exactly how many RBs in Set 1 are affected by the harmonic/IM interference and transmit power of corresponding aggressor uplink RBs, UE can obtain the estimated harmonic/IM suppression level as follows:

$$UE\ \text{harmonic/IM rejection} = P_{tx} - I_h + 10 \cdot \log\left(\frac{D_2}{D_1}\right)$$

where $P_{tx}$ is a transmit power for corresponding aggressor uplink RBs, $D_1$ is the bandwidth of the harmonic /IM interference measured in number of RBs, $D_2$ is the number of desense RBs within Set 1 ($D_2 \leq D_1$), and $I_h$ is an estimate of the harmonic/IM interference level. With the estimated suppression capability, UE can predict worst and typical RSRQ degradation and send several RSRQ offset values such as a typical degradation and a maximum degradation in the measurement reports.

In estimating the harmonic/IM interference level, the harmonic interference levels could be different on each receive antenna port depending on UE transceiver architectures and harmonic/IM scenarios. For example, in Band 4 and Band 17 aggregation, if UE transmits on one antenna, receives with two antennas, and RF chains for Band 17 and Band 4 are derived by the common antenna, then UE has lower harmonic interference level on the receive only antenna port by the antenna isolation level between the transmit antenna and the receive antenna. Thus, the interference estimation may be done independently at each receive antenna port.

In OFDM systems, a resource allocation is a frequency and time allocation that maps information for a particular UE to resource blocks as determined by the scheduler. This allocation depends, for example, on the frequency-selective channel-quality indication reported by the UE to the scheduler. The channel-coding rate and the modulation scheme, which may be different for different resource blocks, are also determined by the scheduler and may also depend on the reported CQI. A UE may not be assigned every sub-carrier in a resource block. It could be assigned every Qth sub-carrier of a resource block, for example, to improve frequency diversity. Thus a resource assignment can be a resource block or a fraction thereof. More generally, a resource assignment is a fraction of multiple resource blocks. Multiplexing of lower-layer control signaling may be based on time, frequency and/or code multiplexing.

The radio resource allocated to a schedulable wireless communication entity is based on an interference impact of the schedulable wireless communication entity operating on the radio resource allocated. The interference impact may be based on any one or more of the following factors: a transmission waveform type of the schedulable wireless communication entity; a maximum allowed and current power level of the schedulable wireless communication entity; bandwidth assignable to the schedulable wireless communication entity; location of the assignable bandwidth in a carrier band; radio frequency distance (path loss) relative to another wireless communications entity; variation in the maximum transmit power of the schedulable wireless communication entity for the assigned bandwidth; separation of assigned band relative to the other wireless communication entity; reception bandwidth of the victim entity, minimum SNR required for operation of the victim entity; and reception multiple access processing (e.g., CDMA, OFDM, or TDMA), among other factors.

Figure 8:
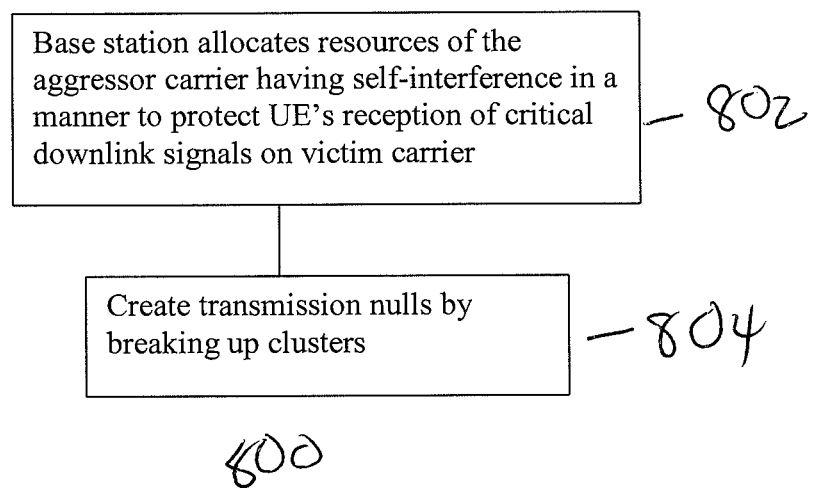
FIG. 8 illustrates a flowchart showing a process in a network entity for handling the self-interference in wireless communication terminals that the network entity supports according to still another embodiment.

According to an embodiment shown in FIG. 8, if both aggressor and victim carriers are activated, then the base station scheduler allocates 802 radio resources of the aggressor carrier to a UE potentially having the self-interference in a manner to protect UE's reception of critical downlink signals transmitted on the victim carrier such as synchronization channel (SCH), physical broadcast channel (PBCH) carrying MasterInformationBlock (MIB), and physical downlink shared channel (PDSCH) carrying SystemInformationBlocks (SIBs) or paging message.

Considering Band 4 (victim) and Band 17 (aggressor) aggregation as the example use case, if the Band 4 carrier is configured as the PCell, the UE must be able to reliably decode MIB and SIBs on the Band 4 carrier. As per EUTRA LTE Rel-10 RRC specification TS 36.331, the UE is not expected to decode MIB and SIBs on the SCell. However, even when the carrier on Band 4 is configured as the SCell, the UE must be capable of continuously monitoring neighbor cells on the Band carrier and completing handover or SCell-to-PCell changes where the new PCell is on the Band 4 carrier. This would necessitate a certain minimum detection performance of SCH on the Band 4 carrier. PBCH and SCH are transmitted on the center PRBs of the transmission band on every 10 ms and 5 ms, respectively. In addition, SIBs and paging messages are transmitted on the part of transmission bandwidth with periodicities of multiple of transmission time interval (TTI). Therefore, protecting DL reception over a portion of the subbands in selected subframes can make the Band 4 carrier remain schedulable on the DL.

In the above example, the self-interference problem primarily arises from physical uplink control channel (PUCCH), SRS, and physical uplink shared channel (PUSCH) and uplink data modulation-reference signal (DM-RS) transmissions on the Band 17 uplink carrier. As the base station scheduler has flexibility on resource allocation of PUSCH/uplink DM-RS/SRS in terms of allocated subframes, frequency location, number of allocated RBs, and transmit power, PUSCH/SRS/DM-RS can be transmitted without causing the harmonic interference to the MIB/SIB/paging/synchronization signal of the Band 4 DL carrier. However, the resources allocated for PUCCH transmission are semi-statically configured by the higher layer (RRC), which may limit scheduler-based coordination approaches.

More specifically, the harmonic distortion caused by the PA can be modeled as follows: Consider the Taylor series expansion (up to the first three terms) of the PA output y(t) as a function input signal x(t). Assuming that $f_c$ is an aggressor component carrier frequency and $3f_c$ is a victim component carrier frequency, only the first and the third order terms contribute to signal components at $f_c$ and $3f_c$. Thus, we focus on just the first and the third order terms:

$$y(t) = a_1 x(t) + a_3 x^3(t)$$

Suppose that $x(t) = \text{Re}[z(t)e^{j2\pi f_c t}]$, where $z(t)$ is the complex-valued baseband signal. After some simplification, the following is obtained:

$$y(t) = \left(a_1 + \frac{3a_2}{4}|z(t)|^2\right)\text{Re}[z(t)e^{j2\pi f_c t}] + \frac{a_3}{4}\text{Re}[z^3(t)e^{j2\pi(3f_c)t}]$$

This implies that the 3rd harmonic response is equal to a 2nd order self-convolution. Assuming a weakly-stationary complex-valued Gaussian input z(t), the power spectrum density of response at $3f_c$ can be written as $$\frac{a_3}{4}S_z(f) \otimes S_z(f) \otimes S_z(f).$$

For contiguous resource allocation (RA), the frequency span at $3f_c$ is simply equal to frequency span delimited by $[3f_{1,f_c}, 3f_{2,f_c}]$ where $f_{1,f_c}$ and $f_{2,f_c}$ are the minimum and maximum frequencies associated with the contiguous RA at $f_c$. For non-contiguous resource allocations with multiple clusters, the response at $3f_c$ must be determined by computing the self-convolution above.

Consider a simultaneous PUSCH and PUCCH transmission over 100 RBs (=20 MHz) at $f_c$. PUCCH spans 3 RBs towards the band edge (RB indices 2, 3, 4 and 95, 96 and 97 in this example) and PUSCH allocation spans RB indices 10 through 49 (Note, the example 3RB PUCCH is not compliant to current LTE spec, but same behavior is expected for 1RB PUCCH). It is assumed that PUSCH is transmitted at a power below that for PUCCH such that the difference of the power spectrum density (PSD) is equal to 7 dB.

Figure 9:
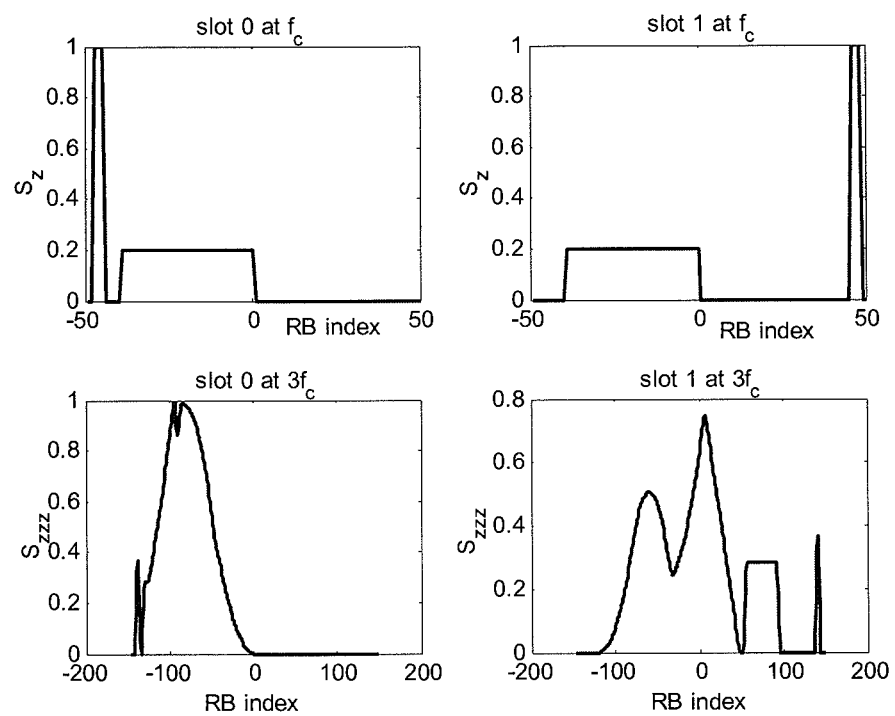
FIG. 9 illustrates a simultaneous physical uplink control channel (PUCCH) and physical uplink shared channel (PUSCH) transmission causing the 3rd order harmonic interference into another component carrier.

FIG. 9 shows the PSD of UL transmission at $f_c$ and the effect of self-convolution at $3f_c$ for slot 0 and slot 1 separately. The region of interest at $3f_c$ is restricted to the RB range [−49, 50] as the response outside of this range is filtered by the UE receive path. If the victim DL center frequency is equal to $3f_c$ where $f_c$ is the UL center frequency, clearly, a substantial portion the DL bandwidth can potentially be interfered with due to the self-convolution component.

Figure 10A:
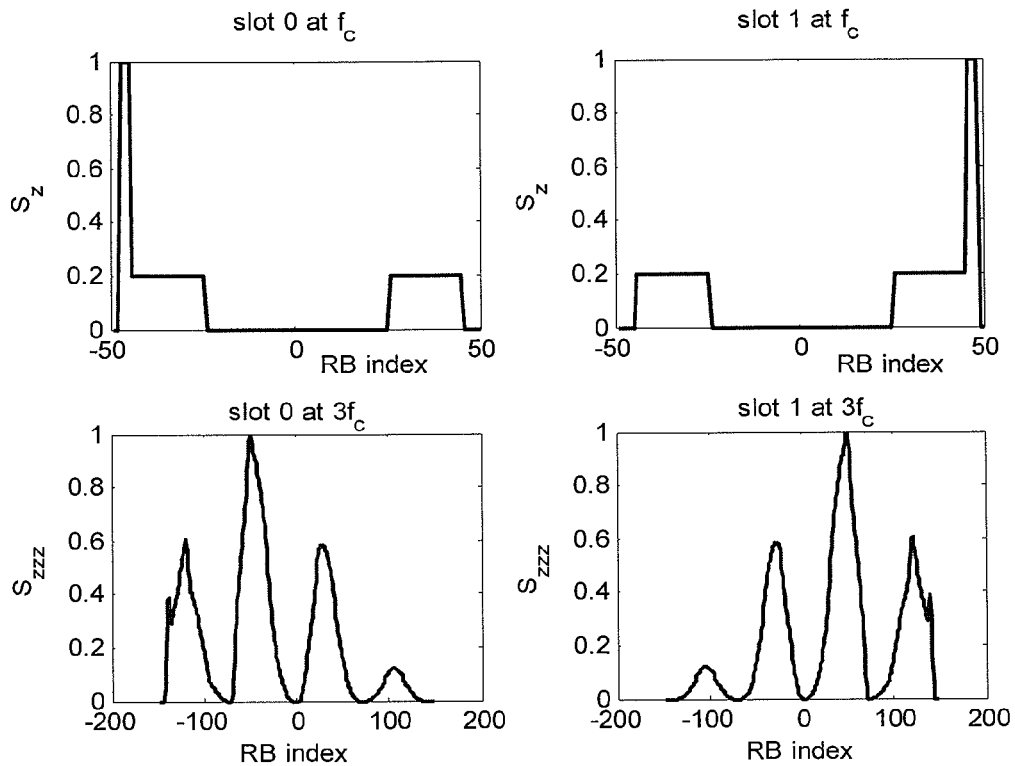
FIGS. 10a and 10b illustrate PUCCH and PUSCH allocations which can avoid the 3rd order harmonic falling into the center 6 physical resource blocks (PRB) of the transmission band.
Figure 10B:
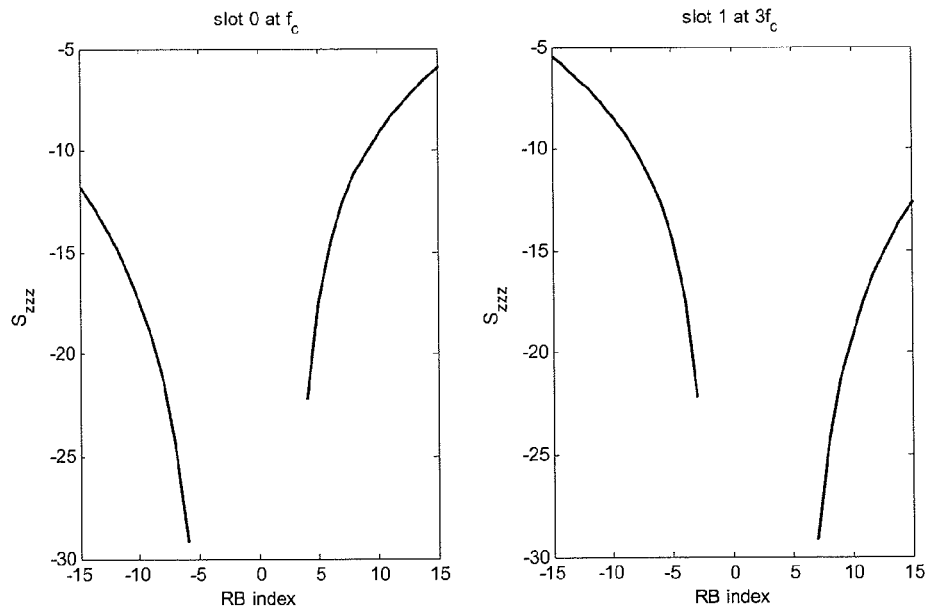

Now suppose that the PUSCH allocation is modified to span 2 clusters such that each cluster has 20 RBs. Further suppose that the PUSCH RBs adjoin PUCCH RBs. The responses at $f_c$ and $3f_c$ are shown in FIG. 10(a). The PSD in dB scale of the self-convolution at $3f_c$ over the center 30 PRBs is shown in FIG. 10(b). Referring back to FIG. 8, it is therefore possible to create transmission nulls (i.e., at least 25 dBc suppression) over the center 6 PRBs by breaking up 804 the PUSCH cluster into two clusters. In this example, it is assumed that the DL center frequency for the high-band is at $3f_c$. If this is not the case, it is still possible to break single cluster PUSCH into multiple clusters in a way that transmission nulls are created over the desired narrowband as long as the PUSCH resource allocation size is within a certain limit.

Figure 11:
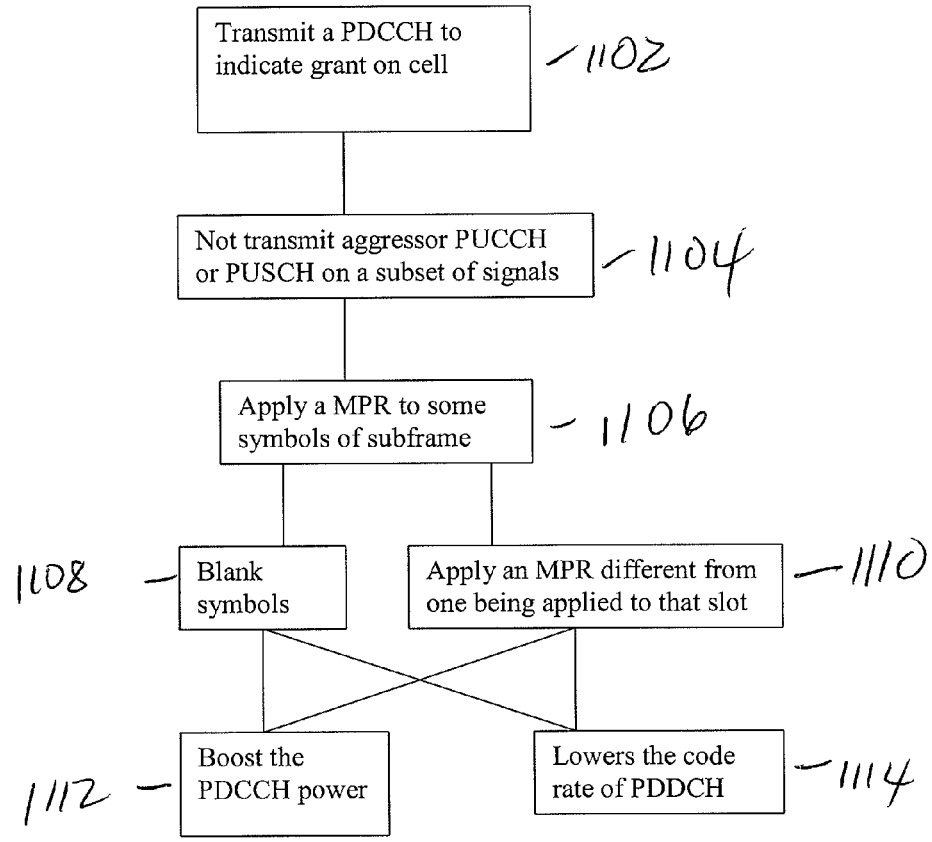
FIG. 11 illustrates a flowchart showing a process for handling the self-interference in a wireless communication terminal according to an embodiment.

While protecting a desired narrowband on the DL can be used for the reliable reception of MIB/SIB/paging/synchronization signal, it is not applicable to protecting the reception of physical downlink control channel (PDCCH), which is a wideband transmission. FIG. 11 shows that one embodiment for guaranteeing the reliable downlink control information for the serving cell associated with the victim carrier is to use cross-carrier scheduling, which transmits 1102 a PDCCH for indicating uplink or downlink grant on the serving cell associated with the victim component carrier on another DL component carrier. For example, when Band 4 (victim) and Band 17 (aggressor) carriers are aggregated and jointly used by UE, the serving base station transmits a PDCCH conveying the scheduling information on resources of the Band 4 UL or DL carrier for the UE on the Band 17 DL carrier. Moreover, physical hybrid ARQ indicator channel (PHICH) that carries the hybrid-ARQ ACK/NACK of Band 4 UL transmission is also transmitted on the Band 17 DL carrier.

FIG. 11 shows a method of communication over the downlink and uplink channels to protect the downlink control information. The method does not transmit 1104 aggressor PUCCH or PUSCH on a subset of symbols. The method also applies 1106 a Maximum Power Reduction (MPR) to some symbols of the subframe. The UE can determine, based on the current value of timing advance (TA), the minimum set of UL symbols (1, 2, 3 or 4) at the aggressor carrier that de-senses the PDCCH symbols at the victim carrier. The UE can then either blank 1108 these symbols or apply 1110 an MPR on these symbols different from the one being applied for that slot. Another embodiment is that based on the self-interference measurement reports, the base station boosts 1112 the PDCCH transmit power or lowers 1114 the code rate of the PDCCH to avoid the increased rate of PDCCH false detection due to the self-interference. The code rate of the PDCCH can be lowered by aggregating more control channel elements (CCEs), in the victim serving cell.

For a given carrier band and band separation, transmissions with larger occupied bandwidth (OBW) create more out of band emissions resulting in a larger adjacent or neighbor channel leakage ratio (ACLR) than transmissions with smaller OBW. To avoid the relative increase in ACLR, it is generally necessary to reduce or de-rate transmission power created by the interfering entity. This can be generally achieved by applying an MPR and an additional Maximum Power Reduction (A-MPR) to the maximum power of the mobile terminal. If PMAX is the maximum power at which the mobile terminal is capable of transmitting, applying an MPR and A-MPR will reduce the maximum power at which the terminal can transmit to PMAX-MPR-AMPR.

It is known for the scheduler to allocate the radio resource based on the interference impact by assigning bandwidth based on power headroom of the schedulable wireless communication entity. Particularly, the scheduler can find a bandwidth size that reduces the self-interference such that the required power reduction does not exceed the allowed MPR and A-MPR of the schedulable wireless communication entity.

A scheduler may also control leakage into adjacent and non-contiguous adjacent bands by scheduling mobile terminals that are "close" to the serving cell in terms of path loss with bandwidth allocations that occupy the entire carrier band or a bandwidth allocation that includes resource blocks that are at the edge of the carrier band (e.g., 5 MHz UTRA or LTE carrier) since due to power control it is very unlikely that such a terminal will be operating at or near to PMAX and therefore unlikely that its current power level would be limited by the operational maximum power (PMAX-MPR-AMPR). A scheduler may schedule terminals that have little or no power margin with bandwidth allocations that exclude resource blocks at the carrier band edge reducing the likelihood of the terminal being power limited by the operational maximum power.

Generally, however, and in common with most non-linear transformations expandable in terms a polynomial power series, UE power amplifiers give rise to undesired adjacent band interference in broad proportion, for a given PA design, to the mean power offered to the PA input. As a consequence of 3rd or 5th order polynomial terms, the frequency at which interference occurs is at 3 or 5 times the frequency of the input signal components, or harmonics thereof. Also, the power of such out-of-band components generally increases at 3 or 5 times the rate of increase of the input power level.

Accordingly, mobile terminals may control their out of band emission levels by limiting the power to the PA. Given a specific rated maximum output (or input) power level designed to achieve a given level of interference into an adjacent frequency band, or level of in-band distortion, a mobile terminal may elect to adjust, for example, reduce its input, power level in order to reduce such unwanted effects. The mobile terminal may also keep its power at a given level, but adjust its operating point (load, bias, supply, etc.) to effect adjustment of the emission levels. As described elsewhere herein, a decision to increase or decrease the input or output PA power may be subject to other criteria, including waveform bandwidth, location in a frequency band, waveform quality metric, among other considerations.

In another embodiment, the wireless communication terminal changes the maximum transmit power limit on a per-slot basis as means of reducing the impact of harmonic or intermodulation distortion on the receive band. As PUCCH is transmitted on different frequency segments across slots (e.g., in the lower half transmission band relative to DC subcarrier on slot 0 and in the upper half transmission band relative to DC subcarrier in slot 1), the frequency location where harmonic/IM distortions fall changes for different slots. Therefore, the UE can implement slot-based desense-MPR (D-MPR) by applying the UL power control equations as below.

The setting of the UE transmit power $P_{PUCCH}(i,n_s)$ for the PUCCH transmission in subframe i and slot $n_s$ is defined by $$P^{PUCCH}(i,n_s)=\min\{P_{CMAX}(n_s), P_{0\_PUCCH}+PL+h(n_{CQI}, n_{HARQ})+\Delta_{F\_PUCCH}(F)+g(i)\}_{[dBm]}$$

where $P_{CMAX}(n_s)$ is the configured maximum UE transmit power set within the following bounds:

$$P_{CMAX\_L}{}^{(n_s)} \le P_{CMAX}(n_s) \le P_{CMAX\_H}$$

where $P_{CMAX\_L}{}^{(n_s)}$=MIN $\{P_{EMAX}$–DTC, $P_{PowerClass}$–MPR–A–MPR–D-MPR$^{(n_s)}$, DTC$\}$ $P_{CMAX\_H}$=MIN $\{P_{EMAX}, P_{PowerClass}\}$, $P_{EMAX}$ is the value given configured by higher layers, $P_{PowerClass}$ is the maximum UE as per the UE power class, MPR is as defined in 3GPP TR 36.807 or 3GPP TS 36.101 for the multi-cluster case A-MPR is as specified in 3GPP TS 36.101, DTc is a pre-specified fixed value, and D-MPR$^{(n_s)}$ is the desense maximum power reduction computed on a per-slot basis as a function of nominal transmit power for PUSCH and PUCCH and the impact of the harmonics and IM on the desired receive band.

The parameter $\Delta_{F\_PUCCH}(F)$ is provided by higher layers.

$h(n_{CQI}, n_{HARQ})$ is a PUCCH format dependent value, where $n_{CQI}$ corresponds to the number of information bits for the channel quality information and $n_{HARQ}$ is the number of HARQ bits.

$P_{O\_PUCCH}$ is a parameter composed of the sum of a cell specific parameter, $P_{O\_NOMINAL\_PUCCH}$ is provided by higher layers, and a UE specific component $P_{O\_UE\_PUCCH}$ provided by higher layers.

g(i) is the current PUCCH power control adjustment state and where g(0) is the first value after reset activated in closed-loop power control mode.

PL is the base station to UE path loss.

The above equation is not a unique parameterization. Note that other approaches to express the dependence of $P_{PUCCH}(i,n_s)$ on slot $n_s$ and D-MPR can be envisioned. Similarly to PUCCH, PUSCH power control equation can be written down as a function of the slot number $n_s$ and D-MPR.

The terminal is typically configured to send reports indicating its available power headroom to assist the scheduler in the base station to allocate resources in an appropriate manner. Since the configured maximum UE transmit power, Pcmax (defined per component carrier), changes at slot boundary within a subframe for a given UL channel (i.e., PUCCH, PUSCH, SRS), it is beneficial for the base station to know the value of Pcmax in each slot so that it can assess the MPR, A-MPR, D-MPR, etc. applied by the UE in each slot. In one embodiment, the UE reports the pair of values for Pcmax (two slots) to the base station bundled in a power headroom report (PHR). Then, the base station must be able to determine the range of actual power backoff applied by the UE on a slot-wise basis to properly take into account the variation of SNR across the symbol and slot boundaries in demodulation and decoding.

Figure 12:
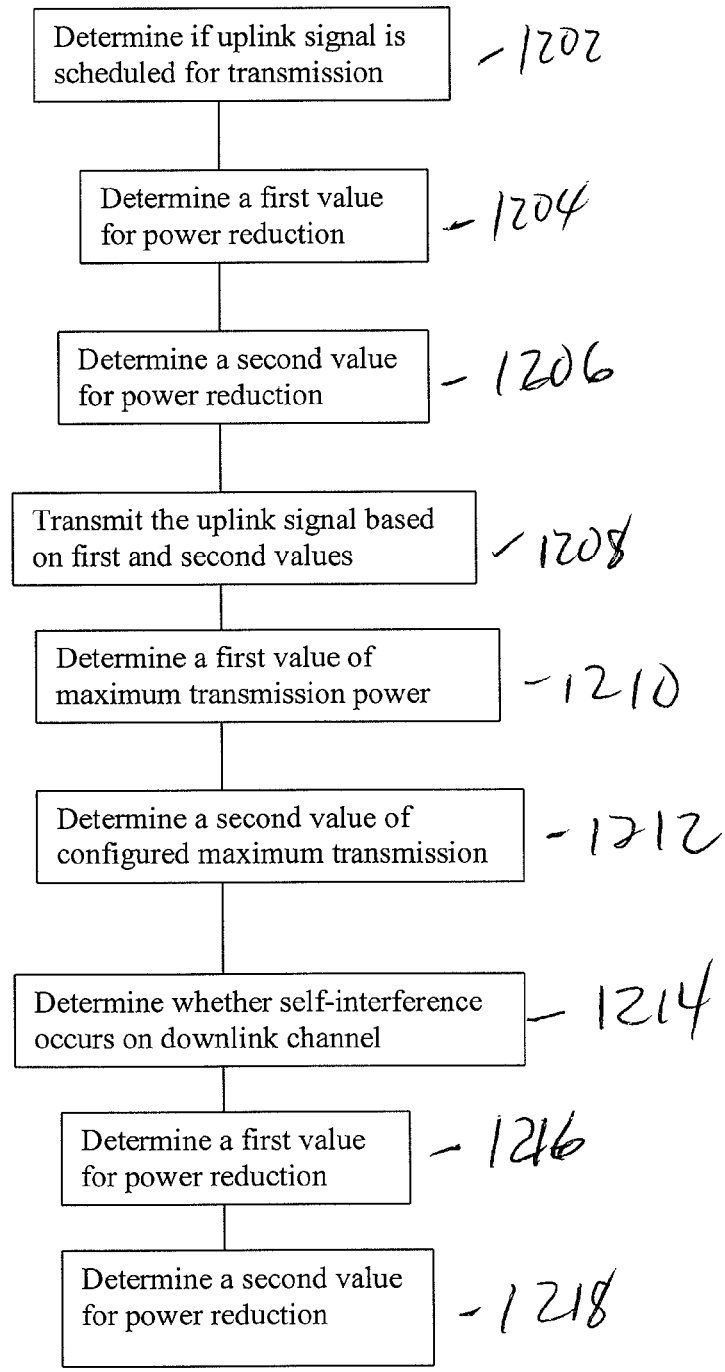
FIG. 12 illustrates a flowchart showing a process for handling the self-interference in a wireless communication terminal according to another embodiment.

Thus, as seen in FIG. 12, the UE may determine 1202 based on a downlink signal whether an uplink signal is scheduled for transmission on the uplink channel in a subframe, wherein the uplink signal spans at least two timeslots in the subframe and the uplink signal comprises a first set of resource blocks in a first timeslot and a second set of resource blocks, different from the first set of resource blocks, in a second time slot; determine 1204 a first value for power reduction for transmission of the uplink signal in the first timeslot, determine 1206 a second value for power reduction for transmission of the uplink signal in the second timeslot; and transmit 1208 the uplink signal in the subframe comprising at least the first timeslot and the second timeslot based on the first value for power reduction and the second value for power reduction. The UE may determine 1210 a first value of configured maximum transmission power (Pcmax(0)) based on the first value for power reduction applicable to the first timeslot, and determine 1212 a second value of configured maximum transmission power (Pcmax (1)) based on the second value for power reduction applicable to the second timeslot, and report the first configured maximum transmission power Pcmax(0) and the second first configured maximum transmission power Pcmax(1) to a first base station. In one implementation, the UE may determine 1214 whether self-interference including harmonic and intermodulation interference can result or occur on the downlink channel based on the scheduled uplink signal transmission in the first timeslot and the second timeslot on the uplink channel and determine 1216 the first value for power reduction based on the determined self-interference in the first timeslot, and determine 1218 the second value for power reduction based on the determined self-interference in the second timeslot. The UE may determine whether self-interference can result on a subframe on the downlink channel, when the subframe comprises critical downlink control information including one or more of primary synchronization channel, secondary synchronization channel, Physical Broadcast Channel (PBCH), System Information Block (SIB) message, and paging message. In another implementation, UE may determine the first value for power reduction in the first slot and the second value for power reduction on the second slot on the uplink channel based on an indication of the severity of a harmonic or intermodulation interference on the first downlink channel resulting from uplink signal transmission in one or both of the first and second slot on the uplink channel.

In one implementation, the UE may report a power headroom report to the first base station. The power headroom report may comprise a power headroom value for the first timeslot and/or a power headroom value for the second timeslot. In another implementation, the power headroom report may comprise a power headroom value derived from the power headroom value for the first timeslot and the power headroom value for the second timeslot.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

The invention claimed is:

1. A method in a wireless communication terminal communicating over at least a first downlink channel and at least an uplink channel, the method comprising:
   determining, by one or more processors based on a downlink signal, whether an uplink signal is scheduled for transmission on the uplink channel in a subframe, wherein the uplink signal spans at least two timeslots in the subframe and the uplink signal comprises a first set of resource blocks in a first timeslot and a second set of resource blocks, different from the first set of resource blocks, in a second time slot;
   determining, by the one or more processors, a first value for power reduction for transmission of the uplink signal in the first timeslot;
   determining, by the one or more processors, a second value for power reduction for transmission of the uplink signal in the second timeslot; and
   transmitting the uplink signal in the subframe comprising at least the first timeslot and the second timeslot based on the first value for power reduction and the second value for power reduction.

2. The method of claim 1, further comprising:
   determining a first value of configured maximum transmission power (Pcmax(0)) based on the first value for power reduction applicable to the first timeslot;
   determining a second value of configured maximum transmission power (Pcmax(1)) based on the second value for power reduction applicable to the second timeslot; and
   reporting the first value of configured maximum transmission power Pcmax(0) and the second value of configured maximum transmission power Pcmax(1) to a first base station.

3. The method of claim 2, further comprising reporting a power headroom report to the first base station, wherein the power headroom report comprises at least one of two power headroom values, where a first one of the two power headroom values is for the first timeslot and a second one of the two power headroom values is for the second timeslot.

4. A method in a wireless communication network entity communicating over at least a first downlink channel and one or more aggressor channels, the method comprising:
   transmitting a physical downlink control channel (PDCCH) for indicating downlink grant on the first downlink channel and uplink grant on a first uplink channel associated with the first downlink channel for a wireless communication terminal on a second downlink channel for cross-carrier scheduling; and
   in response to a self-interference measurement report of the wireless communication terminal, boosting a PDCCH transmit power or aggregating more control channel elements (CCEs) to lower a code rate, on the first downlink channel to avoid an increased rate of PDCCH false detection due to the self-interference.

5. A method in a wireless communication terminal communicating over at least a first downlink channel and one or more uplink channels, the method comprising:
   not transmitting a physical uplink control channel (PUCCH) or a physical uplink shared channel (PUSCH) on a subset of symbols on the one or more uplink channels; and
   applying, by a processor, a Maximum Power Reduction (MPR) to some symbols of a subframe on the one or more uplink channels;
   wherein the subset of symbols not transmitted or transmitted with the applied MPR is determined based on a current value of timing advance.

* * * * *